United States Patent
Kang et al.

(10) Patent No.: US 11,325,507 B2
(45) Date of Patent: May 10, 2022

(54) TETHER ANCHORAGE DEVICE FOR SWIVEL SEAT OF VEHICLE

(71) Applicants: Hyundai Motor Company, Seoul (KR); Kia Motors Corporation, Seoul (KR)

(72) Inventors: Seung Kyu Kang, Hwaseong-si (KR); Dae Hyun Choi, Ansan-si (KR); Myeong Hwan Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/097,257

(22) Filed: Nov. 13, 2020

(65) Prior Publication Data
US 2022/0024358 A1 Jan. 27, 2022

(30) Foreign Application Priority Data
Jul. 21, 2020 (KR) .................... 10-2020-0090001

(51) Int. Cl.
*B60N 2/28* (2006.01)
*B60N 2/64* (2006.01)
(52) U.S. Cl.
CPC ............. *B60N 2/2806* (2013.01); *B60N 2/64* (2013.01)
(58) Field of Classification Search
CPC ................................ B60N 2/2806; B60N 2/64
USPC ........................................................ 297/254
See application file for complete search history.

(56) References Cited

U.S. PATENT DOCUMENTS

| | | | | |
|---|---|---|---|---|
| 6,267,442 B1* | 7/2001 | Shiino | ............... | B60N 2/2809 297/250.1 |
| 7,328,947 B2* | 2/2008 | Laporte | ............... | B60N 2/2893 297/254 X |
| 7,789,462 B2* | 9/2010 | Glover | ............... | B60N 2/2893 297/254 |
| 10,189,382 B2* | 1/2019 | Sammons | ............ | B60N 2/2887 |
| 10,427,560 B2* | 10/2019 | Ishizaka | ............... | B60N 2/2887 |
| 2016/0325658 A1 | 11/2016 | Hodgson | | |

FOREIGN PATENT DOCUMENTS

| | | |
|---|---|---|
| JP | 2015-036282 A | 2/2015 |
| JP | 2017-218006 A | 12/2017 |

\* cited by examiner

*Primary Examiner* — Anthony D Barfield
(74) *Attorney, Agent, or Firm* — Morgan, Lewis & Bockius LLP

(57) ABSTRACT

A tether anchorage device for a swivel seat of a vehicle is provided. The device is configured such that an anchor including a horizontal bar and a vertical bar is mounted on a rear surface of the swivel seat, and a tether belt for fixing a baby seat is anchored to the anchor while being bound in a vertical direction as well as a horizontal direction of the swivel seat, so that the baby seat may be securely fixed to the swivel seat regardless of a rotating position of the swivel seat.

14 Claims, 6 Drawing Sheets

TETHER ANCHORAGE DEVICE FOR SWIVEL SEAT OF VEHICLE

CROSS REFERENCE TO RELATED APPLICATION

The present application claims priority to Korean Patent Application No. 10-2020-0090001, filed Jul. 21, 2020, the entire contents of which is incorporated herein for all purposes by this reference.

BACKGROUND OF THE INVENTION

Field of the Invention

The present invention relates to a tether anchorage device for a swivel seat of a vehicle. More particularly, the present invention relates to a tether anchorage device for a swivel seat of a vehicle, the device intended to securely fix a baby seat to the swivel seat regardless of a rotating position of the swivel seat.

Description of Related Art

In preparation for the release of an autonomous vehicle which may be driven without a driver's control, seats provided with various mechanisms for conversations and meetings between passengers, relaxation and sleeping, and assisting in getting in and out of the vehicle are being researched and developed.

As an example, a swivel seat which may be rotated by 180° or more in a desired direction for multilateral conversations and meetings, seeing an external landscape, and assisting in getting in and out of a vehicle is being developed.

Thus, if the swivel seat is adjusted at a desired rotating angle, the swivel seat may be arranged towards a front which is the same as a driving direction of the vehicle, towards a rear which is opposite to the driving direction of the vehicle, in a lateral direction of the vehicle, or diagonally with respect to a longitudinal direction of a vehicle body.

A so-called "ISOFIX" which is a structure for fixing a baby seat according to the standard established by ISO (International Standard Organization) may be mounted even on the swivel seat.

The "ISOFIX" includes an anchor mounted on a seat of a vehicle, and a tether belt which is a kind of safety belt to bind the baby seat to the anchor.

If the swivel seat is adjusted to a desired rotating angle in a state where the baby seat accommodated on the swivel seat is fixed using the anchor and the tether belt, the swivel seat and the baby seat may be arranged in a longitudinal direction of a vehicle body, in a lateral direction which is perpendicular to the longitudinal direction of the vehicle body, or diagonally with respect to the longitudinal direction of the vehicle body.

In other words, the baby seat is also adjusted in the same direction when the rotating angle of the swivel seat is adjusted.

When the swivel seat and the baby seat are arranged towards a front which is the same as a driving direction of the vehicle or towards a rear which is opposite to the driving direction of the vehicle, the fixed state of the baby seat may be securely maintained even in spite of shocks (sudden braking, a quick start, collision accidents, etc.) acting in a front and rear direction of the vehicle body.

However, when the swivel seat and the baby seat are arranged in a lateral direction which is perpendicular to the longitudinal direction of the vehicle body, or diagonally with respect to the longitudinal direction of the vehicle body, there is no means for holding a side portion of the baby seat, so that a reduction in constraint force of the baby seat and the removal of the baby seat may be caused by shocks acting in the front and rear direction of the vehicle body, and consequently injury may occur.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a tether anchorage device configured for a swivel seat of a vehicle, in which an anchor including a horizontal bar and a vertical bar is mounted on a rear surface of the swivel seat, and a tether belt for fixing a baby seat is anchored to the anchor while being bound in a vertical direction as well as a horizontal direction of the swivel seat, so that the baby seat may be securely fixed to the swivel seat regardless of a rotating position of the swivel seat.

To achieve the objective of the present invention, various aspects of the present invention provide a tether anchorage device configured for a swivel seat of a vehicle, the tether anchorage device including a back panel including an anchor-trim mounting hole, and mounted on a rear surface of a seatback; an anchor trim configured to have an open space for placing an anchor therein, and mounted in the anchor-trim mounting hole of the back panel; an anchor fixed to an internal surface of the back panel, and inserted into the anchor trim to be placed in the open space for placing the anchor in the open space; and a tether belt bound at a first end portion thereof to a baby seat, a second end portion thereof being in close contact with a side portion and a rear surface of the seatback or being in close contact with an upper portion and the rear surface of the seatback to be bound to the anchor.

A garnish may be formed on an edge portion of a front of the anchor trim to be in close contact with an external circumference of the anchor-trim mounting hole.

A locker may be formed on an upper plate of the anchor trim to be caught and locked by an internal circumference of an upper portion of the anchor-trim mounting hole, and an elastic clip may be formed on a lower plate of the anchor trim to be caught and locked by an internal circumference of a lower portion of the anchor-trim mounting hole.

A plurality of contact support end portions may be formed on a side plate of the anchor trim to be in close contact with a side portion of the anchor-trim mounting hole.

An anchorage hole may be formed in each of the upper plate, the lower plate, and the side plate of the anchor trim, and a slit may be formed in a rear surface of the anchor trim to insert the anchor into the anchorage hole. The slit may be formed in a cross shape.

The anchor may include an anchor bar including a horizontal bar and a vertical bar integrated with each other to be inserted through the slit of the anchor trim and disposed in the open space for placing the anchor in the open space; and a mounting bracket formed on an end portion of each of the horizontal bar and the vertical bar of the anchor bar to be mounted around four sides of the anchor-trim mounting hole of the back panel.

A stepped portion may be formed on the mounting bracket to allow the anchor bar to protrude and be inserted into the open space for placing the anchor in the open space.

The horizontal bar and the vertical bar of the anchor bar may be formed in a shape of a circular section which is opened at a side by placing a cross-shaped flat plate integrated with the mounting bracket between a press upper mold having a cross-shaped groove and a press lower mold having a cross-shaped protrusion, and then performing pressing between the press upper mold and the lower mold.

A hook may be mounted on the second end portion of the tether belt to be hooked onto the anchor.

A seatback cover may be attached to the back panel, and an insert path of the tether belt may be formed between the back panel and the seatback cover.

Through the above-described means for solving problems occurring, various aspects of the present invention provide the following effects.

First, the baby seat may be securely fixed regardless of the rotating position of the swivel seat, thus preventing a reduction in constraint force of the baby seat and the removal of the baby seat due to shocks acting on a vehicle.

Second, the anchor for anchoring the tether belt is provided in a cross-shaped structure, so that stress acting on the anchor through the tether belt may be dispersed, and thus the deformation of the anchor may be prevented.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
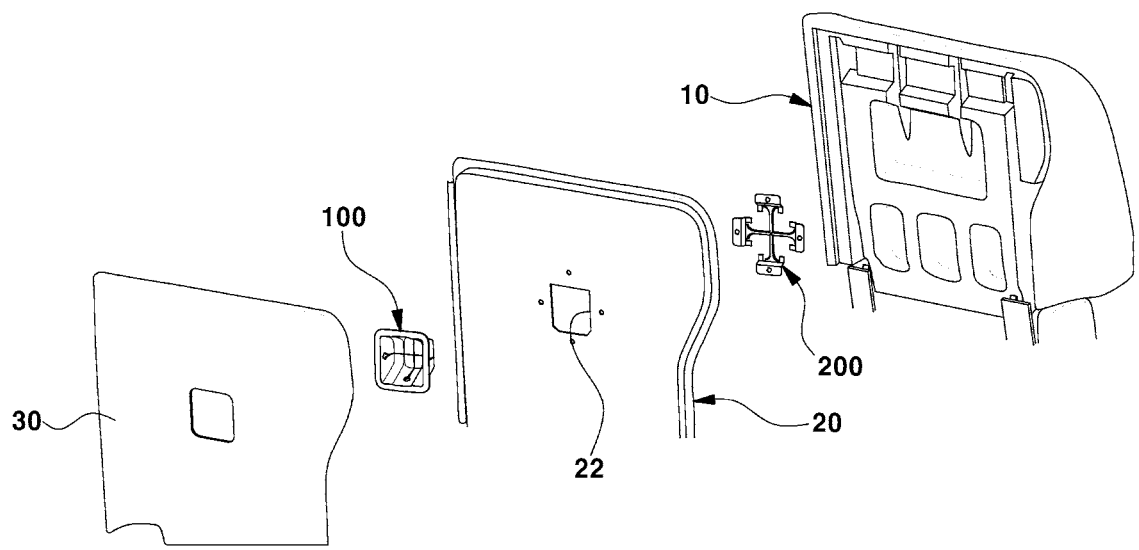
FIG. 1 is an exploded perspective view showing a tether anchorage device configured for a swivel seat of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings.

Figure 10:
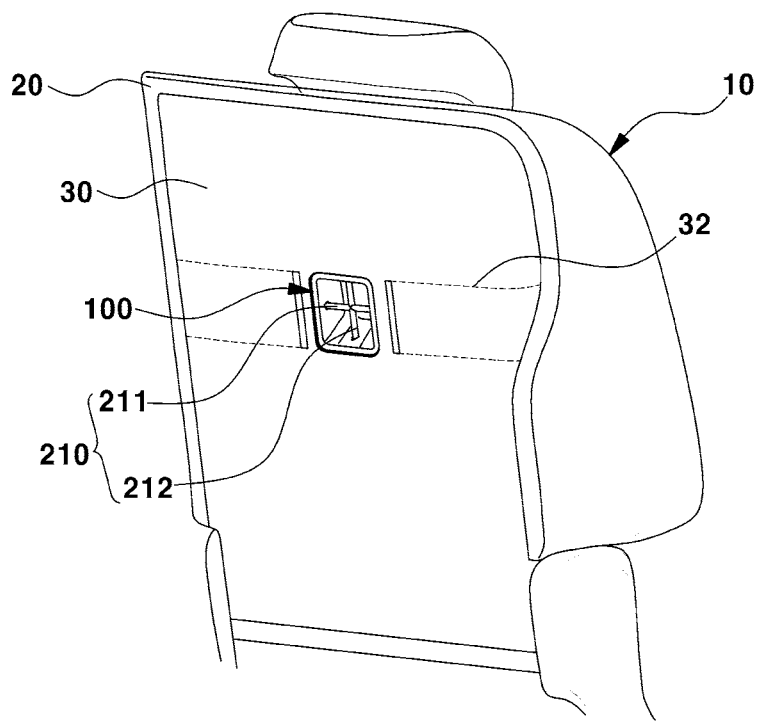
FIG. 10 is a perspective view showing a state in which the tether anchorage device configured for the swivel seat of the vehicle according to various exemplary embodiments of the present invention has been assembled.

FIG. 1 is an exploded perspective view showing a tether anchorage device configured for a swivel seat of a vehicle according to various exemplary embodiments of the present invention, and FIG. 10 is a perspective view showing a state in which the tether anchorage device configured for the swivel seat of the vehicle according to various exemplary embodiments of the present invention has been assembled.

Referring to FIG. 1, a back panel 20 is attached to a rear surface of a seatback 10, and an anchor-trim mounting hole 22 is penetrated through the back panel 20.

Before the back panel 20 is mounted on the rear surface of the seatback 10, an anchor trim 100 is mounted in the anchor-trim mounting hole 22, and an anchor 200 is mounted on the anchor trim.

Figure 2:
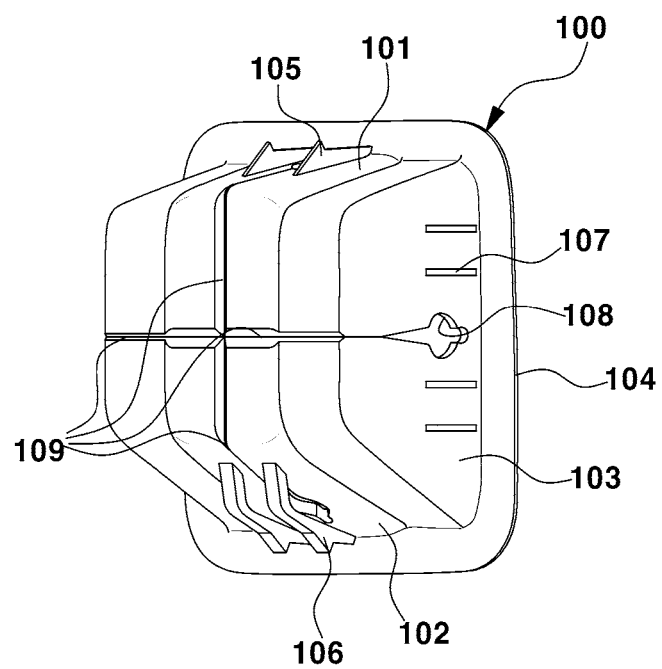
FIG. 2 and FIG. 3 are perspective views showing an anchor trim among components of the tether anchorage device configured for the swivel seat of the vehicle according to various exemplary embodiments of the present invention.
Figure 3:
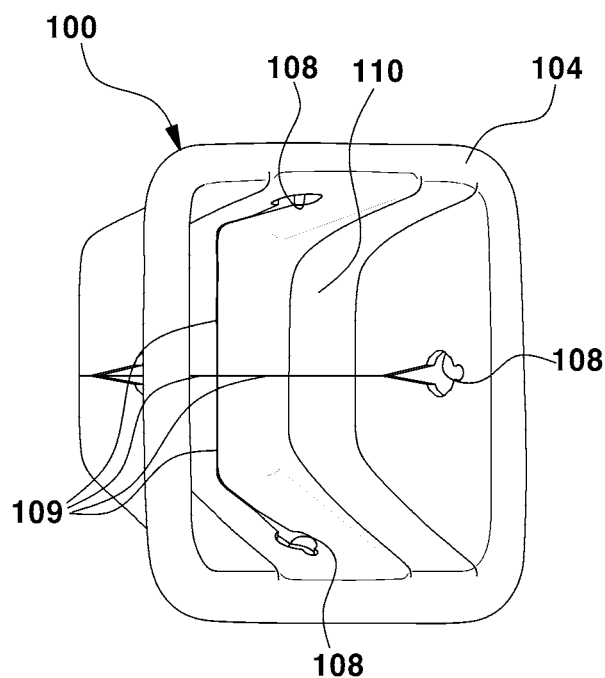
Figure 4:
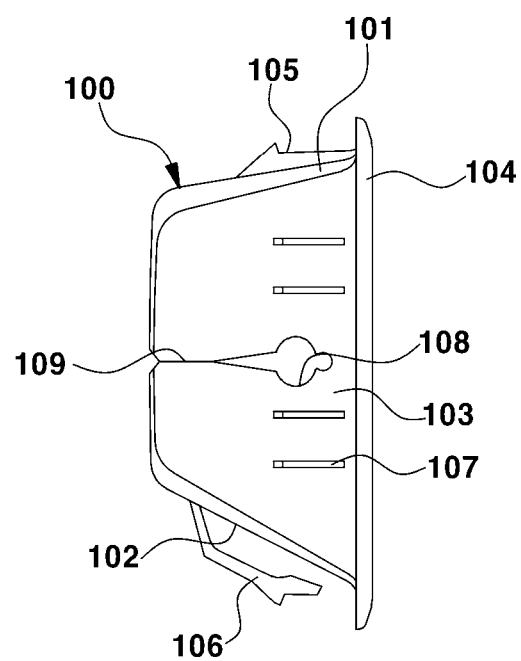
FIG. 4 is a side view showing the anchor trim among the components of the tether anchorage device configured for the swivel seat of the vehicle according to various exemplary embodiments of the present invention.

As shown in FIG. 2, FIG. 3 and FIG. 4, the anchor trim 100 is configured such that an open space 110 for placing the anchor is opened towards a rear of a vehicle body, and is mounted in the anchor-trim mounting hole 22 of the back panel 20.

A garnish 104 is formed on an edge portion of a front of the anchor trim 100 to be in close contact with an external circumference of the anchor-trim mounting hole 22 (external surface of the back panel around the anchor-trim mounting hole).

Furthermore, a locker 105 is formed on an upper plate 101 of the anchor trim 100 to be caught and locked by an internal circumference of an upper portion of the anchor-trim mounting hole 22 (inner surface of the back panel adjacent to the upper portion of the anchor-trim mounting hole). An elastic clip 106 is integrally formed on a lower plate 102 of the anchor trim 100 to be caught and locked by an internal circumference of a lower portion of the anchor-trim mounting hole 22 (inner surface of the back panel adjacent to the lower portion of the anchor-trim mounting hole).

Furthermore, a plurality of contact support end portions 107 protrudes integrally from the side plate 103 of the anchor trim 100 to be in close contact with a side portion of the anchor-trim mounting hole 22.

Anchorage holes 108 are formed in the upper plate 101, the lower plate 102, and both side plates 103 of the anchor trim 100, and a slit 109 extending to the anchorage hole 108 is formed in a rear surface of the anchor trim 100 to insert the anchor 200 into the anchorage hole 108.

In detail, the slit 109 extends to the anchorage holes 108 formed in the upper plate 101, the lower plate 102, and both side plates 103 of the anchor trim 100 while branching in four directions from a center portion of the rear surface of the anchor trim 100, thus forming a cross-shaped arrangement when seen from the rear surface.

Figure 7:
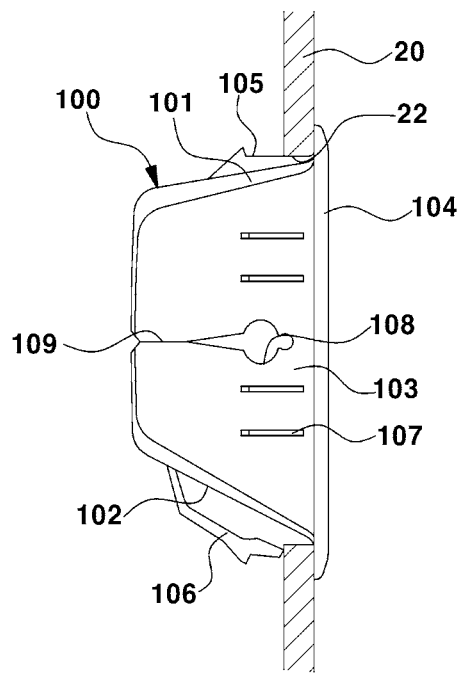
FIG. 7 is a side sectional view showing a state in which the anchor trim among the components of the tether anchorage device configured for the swivel seat of the vehicle according to various exemplary embodiments of the present invention is mounted on a back panel.

Thus, if the anchor trim 100 is inserted into the anchor-trim mounting hole 22 from an external surface of the back panel 20, as shown in FIG. 7, the locker 105 formed on the upper plate 101 of the anchor trim 100 is caught and fastened to the internal circumference of the upper portion of the anchor-trim mounting hole 22. Furthermore, while the elastic clip 106 formed on the lower plate 102 of the anchor trim 100 is compressed and then elastically restored, the elastic clip is caught and fastened to the internal circumference of the lower portion of the anchor-trim mounting hole 22.

Furthermore, the contact support end portion 107 formed on the side plate 103 of the anchor trim 100 is in close contact with the side portion of the anchor-trim mounting hole 22, thus eliminating left and right gaps of the anchor trim 100.

Here, the garnish 104 formed on the edge portion of the front of the anchor trim 100 is in close contact with the external surface of the back panel 20 which is the external circumference of the anchor-trim mounting hole 22, and the open space 110 for placing the anchor of the anchor trim 100 is exposed toward the rear of the vehicle body.

Next, the anchor 200 is inserted into the anchor trim 100 to be disposed in the open space 110 for placing the anchor, so that the anchor is fixedly fastened to the internal surface of the back panel 20.

Figure 5:
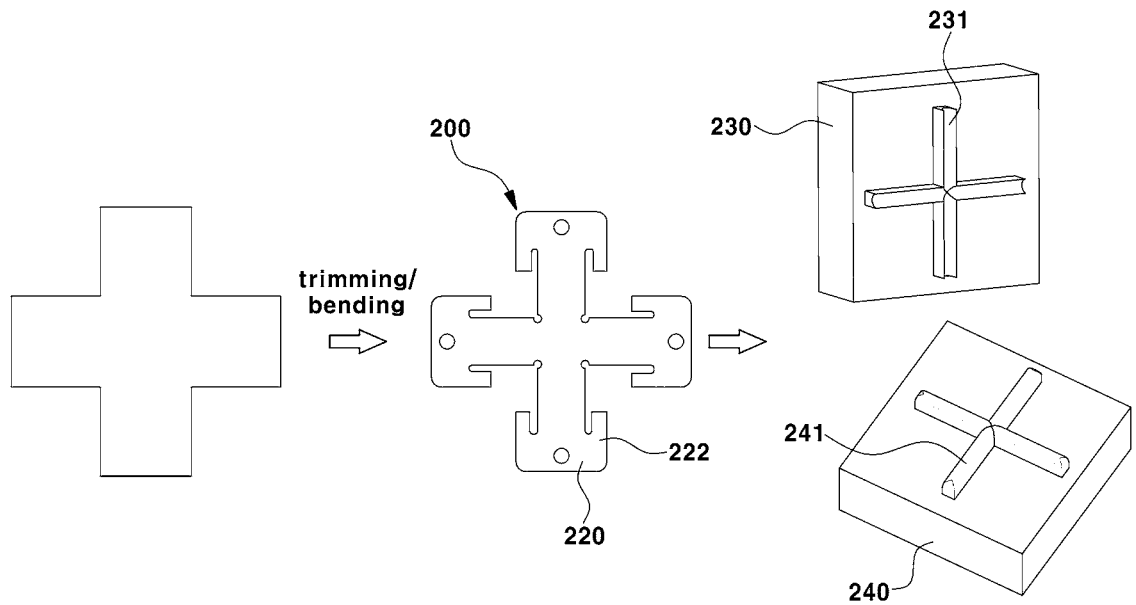
FIG. 5 is a schematic view showing a process of manufacturing an anchor among the components of the tether anchorage device configured for the swivel seat of the vehicle according to various exemplary embodiments of the present invention.

To this end, as shown in FIG. 5, the anchor 200 is manufactured through a step of preparing a cross-shaped steel plate, a step of trimming and bending the cross-shaped steel plate in a predetermined shape, and a press-forming step.

Figure 6:
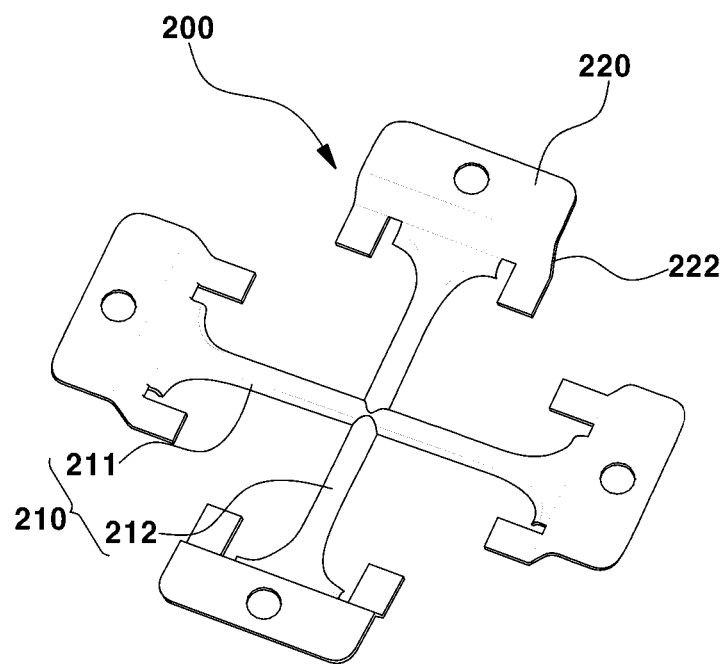
FIG. 6 is a perspective view showing the anchor among the components of the tether anchorage device configured for the swivel seat of the vehicle according to various exemplary embodiments of the present invention.

As shown in FIG. 6, the anchor 200 manufactured as such includes a cross-shaped anchor bar 210 including a horizontal bar 211 and a vertical bar 212, and a mounting bracket 220 formed on an end portion of each of the horizontal bar 211 and the vertical bar 212.

A stepped portion 222 is formed on the mounting bracket 220 so that the anchor bar 210 protrudes to the open space 110 for placing the anchor of the anchor trim 100 by the trimming and bending process.

Each of the horizontal bar 211 and the vertical bar 212 forming the anchor bar 210 is formed in the shape of a circular section which is opened at a side by the press forming step to easily catch a hook 302 of the tether belt 300 and increase rigidity, as will be described later.

In detail, the horizontal bar 211 and the vertical bar 212 of the anchor bar 210 are formed in the shape of a circular section which is opened at a side by placing a cross-shaped flat plate integrated with the mounting bracket 220 between a press upper mold 230 having a cross-shaped groove 231 and a press lower mold 240 having a cross-shaped protrusion 241 before the press forming step, and then performing pressing between the press upper mold 230 and the lower mold 240.

Figure 12:
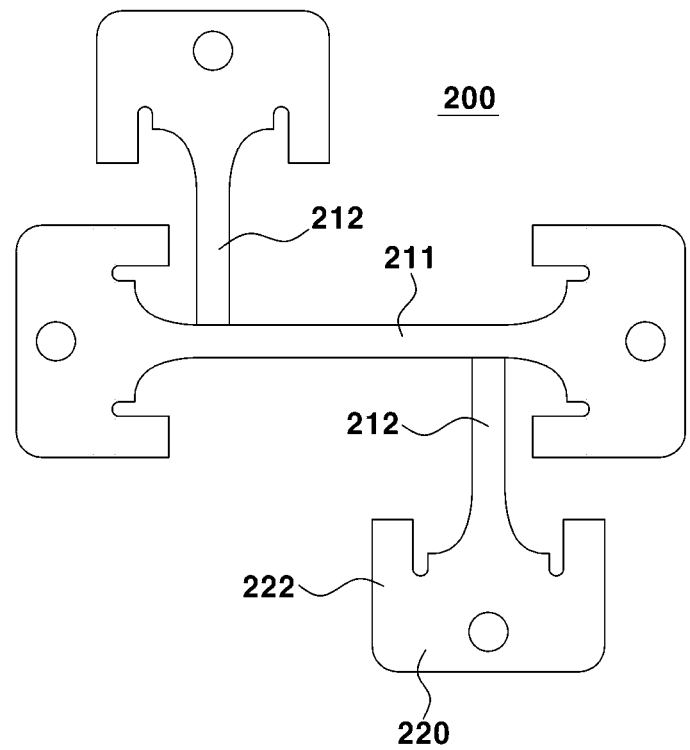
FIG. 12 is a schematic view showing another exemplary embodiment of an anchor among the components of the tether anchorage device configured for the swivel seat of the vehicle according to various exemplary embodiments of the present invention.

Furthermore, as another exemplary embodiment of the anchor bar 210, as shown in FIG. 12, the horizontal bar 211 and the vertical bar 212 may be formed not in a cross shape but any intersecting shape.

Figure 8:
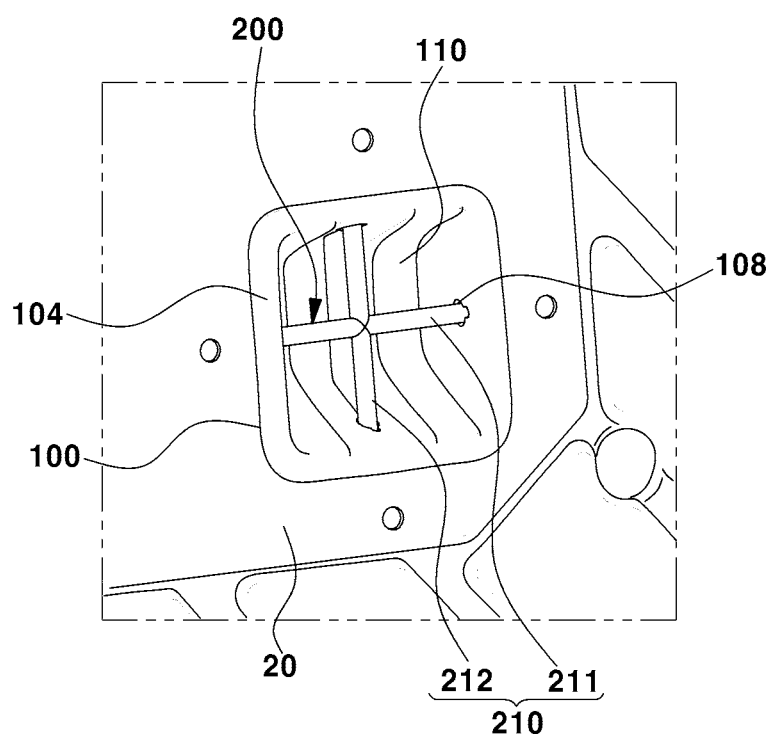
FIG. 8 and FIG. 9 are partially enlarged perspective views showing a state in which the anchor among the components of the tether anchorage device configured for the swivel seat of the vehicle according to various exemplary embodiments of the present invention is mounted on an anchor trim.

Therefore, if the horizontal bar 211 and the vertical bar 212 of the anchor bar 210 are inserted through the slit 109 of the anchor trim 100 to the anchorage hole 108, as shown in FIG. 8, the horizontal bar 211 and the vertical bar 212 are disposed in a cross shape in the open space 110 for placing the anchor of the anchor trim 100.

Figure 9:
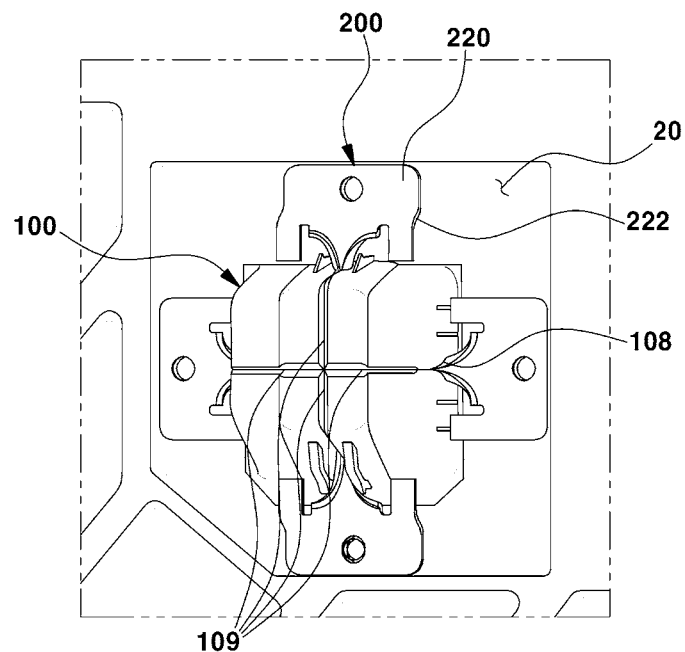

Furthermore, if the horizontal bar 211 and the vertical bar 212 of the anchor bar 210 are inserted through the slit 109 of the anchor trim 100 to the anchorage hole 108, as shown in FIG. 9, the mounting bracket 220 is in close contact with the internal surface of the back panel 20, and secures the mounting bracket 220 to the internal surface of the back panel 20 via spot welding, a screw, or the like.

Meanwhile, as shown in FIGS. 1 and 10, a seatback cover 30 in a shape of a back board may be further attached to the back panel 20, and an insert path 32 of the tether belt 300 may be formed between the back panel 20 and the seatback cover 30.

Figure 11:
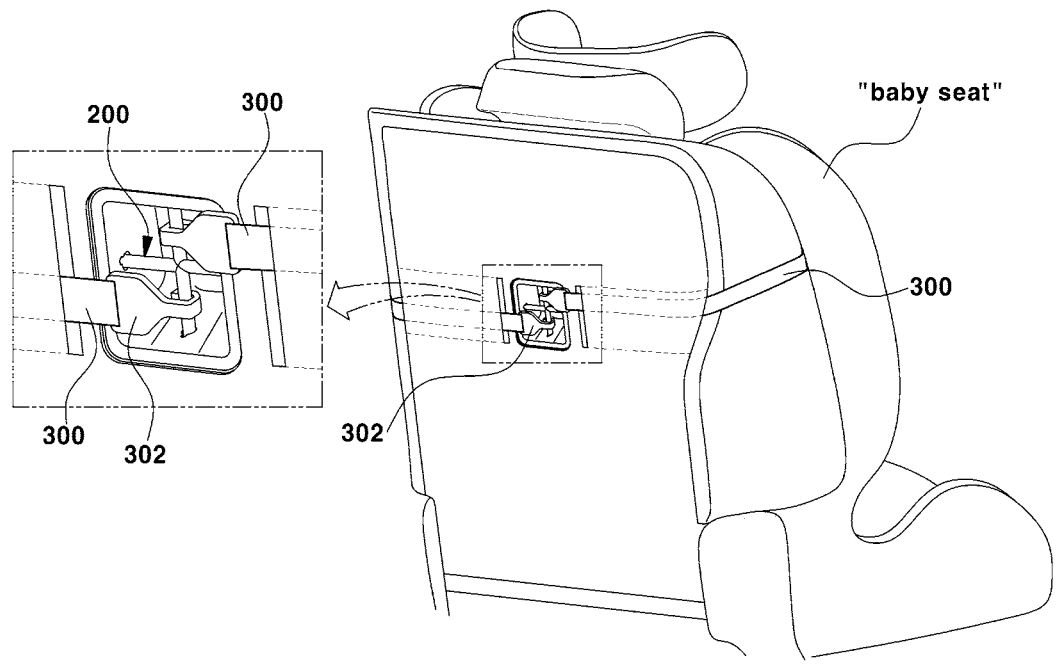
FIG. 11 is a perspective view showing an example in which a baby seat is anchored by the tether anchorage device configured for the swivel seat of the vehicle according to various exemplary embodiments of the present invention.

Therefore, as shown in FIG. 11, after the baby seat 400 is accommodated on the swivel seat, one end portion of the tether belt 300 is bound to a rear portion of the baby seat 400, the other end portion of the tether belt 300 is in close contact with both sides of the seatback 10, and simultaneously passes through the insert path 32 formed between the back panel 20 and the seatback cover 30.

Subsequently, the other end portion of the tether belt 300 is pulled toward the anchor bar 210 with a predetermined tension, and simultaneously the hook 302 of the tether belt 300 is hooked to the vertical bar 212, so that the baby seat 400 is securely secured and constrained by the tether belt 300.

Here, as the tether belt 300 is secured to the baby seat 400 while coming into close contact with both sides and the rear surface of the seatback 10, the baby seat may be securely secured regardless of the rotated position of the swivel seat, and thereby it is possible to prevent a reduction in constraint force of the baby seat and the removal of the baby seat due to shocks acting on a vehicle.

For example, even if the swivel seat is arranged in the same direction as a longitudinal direction of the vehicle body, or in a lateral direction which is perpendicular to the longitudinal direction of the vehicle body, or in a diagonal direction with respect to the longitudinal direction of the vehicle body, the fixed state of the baby seat accommodated on the swivel seat may be securely maintained even under shocks acting in a front and rear direction and a lateral direction of the vehicle body.

As another example of use, when the swivel seat is arranged in the same direction as the longitudinal direction of the vehicle body, one end portion of the tether belt 300 is bound to the baby seat 400, and then the other end portion of the tether belt 300 is in close contact with an upper surface of the seatback 10 to be pulled toward the anchor bar 210 by predetermined tension and simultaneously hook the hook 302 of the tether belt 300 onto the horizontal bar 211, so that the baby seat 400 may be securely secured.

Meanwhile, the anchor bar 210 for hooking the hook 302 of the tether belt 300 is formed in a cross-shaped structure including the horizontal bars 211 and the vertical bars 212, so that stress acting on the anchor bar 210 through the hook 302 of the tether belt 300 may be dispersed to a horizontal bar 211 and a vertical bar 212 onto which the hook 302 is not hooked, and thereby the deformation of the anchor 200 may be prevented.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A tether anchorage device for a swivel seat of a vehicle, the tether anchorage device comprising:
   a back panel including an anchor-trim mounting hole and mounted on a rear surface of a seatback;
   an anchor trim having an open space for placing an anchor therein, and mounted in the anchor-trim mounting hole of the back panel;
   an anchor fixed to an internal surface of the back panel, and inserted into the anchor trim to be placed in the open space for placing the anchor in the open space, wherein the anchor includes:
      an anchor bar including a horizontal bar and a vertical bar integrated with each other to be inserted through a slit of the anchor trim and disposed in the open space for placing the anchor in the open space; and
      a mounting bracket formed on an end portion of each of the horizontal bar and the vertical bar of the anchor bar to be mounted around four sides of the anchor-trim mounting hole of the back panel.

2. The tether anchorage device of claim 1, further including:
   a tether belt bound at a first end portion thereof to a baby seat, and a second end portion thereof being in contact with a side portion and a rear surface of the seatback or being in contact with an upper portion and the rear surface of the seatback to be bound to the anchor.

3. The tether anchorage device of claim 2, wherein a hook is mounted on the second end portion of the tether belt to be hooked onto the anchor.

4. The tether anchorage device of claim 2, wherein a seatback cover is attached to the back panel, and an insert path of the tether belt is formed between the back panel and the seatback cover.

5. The tether anchorage device of claim 1, wherein a garnish is formed on an edge portion of a front of the anchor trim to be in contact with an external circumference of the anchor-trim mounting hole.

6. The tether anchorage device of claim 1,
   wherein the anchor trim includes an upper plate and a lower plate,
   wherein a locker is formed on the upper plate of the anchor trim to be caught and locked by an internal circumference of an upper portion of the anchor-trim mounting hole, and
   wherein an elastic clip is formed on the lower plate of the anchor trim to be caught and locked by an internal circumference of a lower portion of the anchor-trim mounting hole.

7. The tether anchorage device of claim 1, wherein a plurality of contact support end portions is formed on a side plate of the anchor trim to be in contact with a side portion of the anchor-trim mounting hole.

8. The tether anchorage device of claim 1,
   wherein the anchor trim includes an upper plate, a lower plate and a side plate,
   wherein an anchorage hole is formed in each of the upper plate, the lower plate, and the side plate of the anchor trim, and
   wherein a slit is formed in a rear surface of the anchor trim, the anchor being inserted into the anchorage hole through the slit.

9. The tether anchorage device of claim 8, wherein the slit is formed in a cross shape.

10. The tether anchorage device of claim 1, wherein a stepped portion is formed on the mounting bracket to allow the anchor bar to protrude and be inserted into the open space for placing the anchor in the open space.

11. The tether anchorage device of claim 1, wherein the horizontal bar and the vertical bar of the anchor bar are formed in a shape of a circular section which is opened at a side by placing a cross-shaped flat plate integrated with the mounting bracket between a press upper mold having a cross-shaped groove and a press lower mold having a cross-shaped protrusion, and then performing pressing between the press upper mold and the lower mold.

12. The tether anchorage device of claim 1, wherein horizontal bar and the vertical bar are arranged in an intersecting shape, and are integrated with each other.

13. The tether anchorage device of claim 1,
   wherein the slit is formed in a rear surface of the anchor trim, and
   wherein the anchor includes:
      the horizontal bar;
      the vertical bar including a first vertical bar fixed to a first portion of the horizontal bar; and a second vertical bar fixed to a second portion of the horizontal bar and aligned in a opposite direction of the first vertical bar with respect to the horizontal bar,
      wherein the second portion of the horizontal bar is offset from the first portion of the horizontal bar in a predetermined distance, and wherein the horizontal bar, the first vertical bar, and the second vertical bar are inserted through the slit of the anchor trim and disposed in the open space for placing the anchor in the open space; and the mounting bracket including first and second mounting brackets formed on distal end portions of each of the horizontal bar and third and fourth mounting brackets formed on distal ends of the first vertical bar and the second vertical bar to be mounted around the four sides of the anchor-trim mounting hole of the back panel.

14. The tether anchorage device of claim 13, wherein a stepped portion is formed on the first, second, third and fourth mounting brackets.

\* \* \* \* \*